(12) United States Patent
Sakai

(10) Patent No.: US 7,791,462 B2
(45) Date of Patent: Sep. 7, 2010

(54) OCCUPANT DETECTING APPARATUS

(75) Inventor: Morio Sakai, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 309 days.

(21) Appl. No.: 12/019,404

(22) Filed: Jan. 24, 2008

(65) Prior Publication Data
US 2008/0204264 A1 Aug. 28, 2008

(30) Foreign Application Priority Data
Feb. 28, 2007 (JP) ............................... 2007-049331

(51) Int. Cl.
*B60Q 1/00* (2006.01)
(52) U.S. Cl. .................... 340/457.1; 340/457; 340/438; 324/207.13
(58) Field of Classification Search ............... 340/457.1
See application file for complete search history.

(56) References Cited

U.S. PATENT DOCUMENTS 6,870,472 B2 * 3/2005 Gift et al. ................... 340/457

2002/0171540 A1 * 11/2002 Ando et al. .................. 340/457
2005/0216158 A1 * 9/2005 Sakai .......................... 701/45

FOREIGN PATENT DOCUMENTS

JP 9-2172 1/1997
JP 2001-74541 3/2001

* cited by examiner

*Primary Examiner*—Benjamin C Lee
*Assistant Examiner*—David Moseley
(74) *Attorney, Agent, or Firm*—Oblon, Spivak, McClelland, Maier & Neustadt, L.L.P.

(57) ABSTRACT

An occupant detecting apparatus includes a detecting portion detecting whether an occupant is seated on a seat, and a judging portion judging whether the occupant occupies the seat on the basis of information detected by the detecting portion. The judging portion judges that the seat is unoccupied by the occupant when a state where a detection that the occupant is not seated on the seat by the detecting portion continues for a judgment time after the detecting portion detects that the seat is occupied by the occupant.

4 Claims, 3 Drawing Sheets

OCCUPANT DETECTING APPARATUS

CROSS REFERENCE TO RELATED APPLICATIONS

This application is based on and claims priority under 35 U.S.C. §119 with respect to Japanese Patent Application No. 2007-049331 filed on Feb. 28, 2007, the entire content of which is incorporated herein by reference.

FIELD OF THE INVENTION

The present invention relates to an occupant detecting apparatus.

BACKGROUND

A known occupant detecting apparatus is arranged, for example, at a front passenger seat in a vehicle to judge whether or not an occupant occupies the passenger seat. And, for example, when it is judged that an occupant occupies the passenger seat by the occupant detecting apparatus, the occupant is informed to fasten his/her seatbelt by a blinking light, or the like.

The known occupant detecting apparatus includes a load sensor which detects a load applied to a seat. The known occupant detecting apparatus also includes a judging means which judges that the occupant occupies the seat when detecting a seated state where the occupant is seated on the seat by detecting a state that a load value detected by the load sensor is equal to or greater than a predetermined value, and judges that the occupant does not occupy the seat when detecting a non-seated state where the occupant is not seated on the seat by detecting a state that the load value detected by the load sensor is less than the predetermined value (See JP2001-74541A).

According to the known occupant detecting apparatus described in JP2001-74541A, judgment results may be frequently changed because whether or not the occupant occupies the seat is judged simply by whether the occupant is seated in the seat (i.e., seated state) or the occupant is not seated in the seat (i.e., non-seated state). For example, a load applied to the seat changes when the occupant who occupies the seat changes his/her posture. Consequently, alternations from the seated state to the non-seated state, or vice versa, may be frequently occurred, and thus frequently changing the judgment results. With a construction which informs the occupant to fasten the seatbelt by blinking the light, or the like, blinking operations or stopping of the blinking operations of the light is frequently repeated by the frequent alternations of the judgment results (i.e., seated state or non-seated state), which brings drawbacks, for example, irritating the occupant and resulting in being visually unattractive.

A need thus exists for an occupant detecting apparatus which is not susceptible to the drawback mentioned above.

SUMMARY OF THE INVENTION

In light of the foregoing, the present invention provides an occupant detecting apparatus, which includes a detecting means detecting whether an occupant is seated on a seat, and a judging means judging whether the occupant occupies the seat on the basis of information detected by the detecting means. The judging means judges that the seat is unoccupied by the occupant when a state where a detection that the occupant is not seated on the seat by the detecting means continues for a judgment time after the detecting means detects a state that the seat is occupied by the occupant.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to the illustrations of drawing figures as follows.

Figure 1:
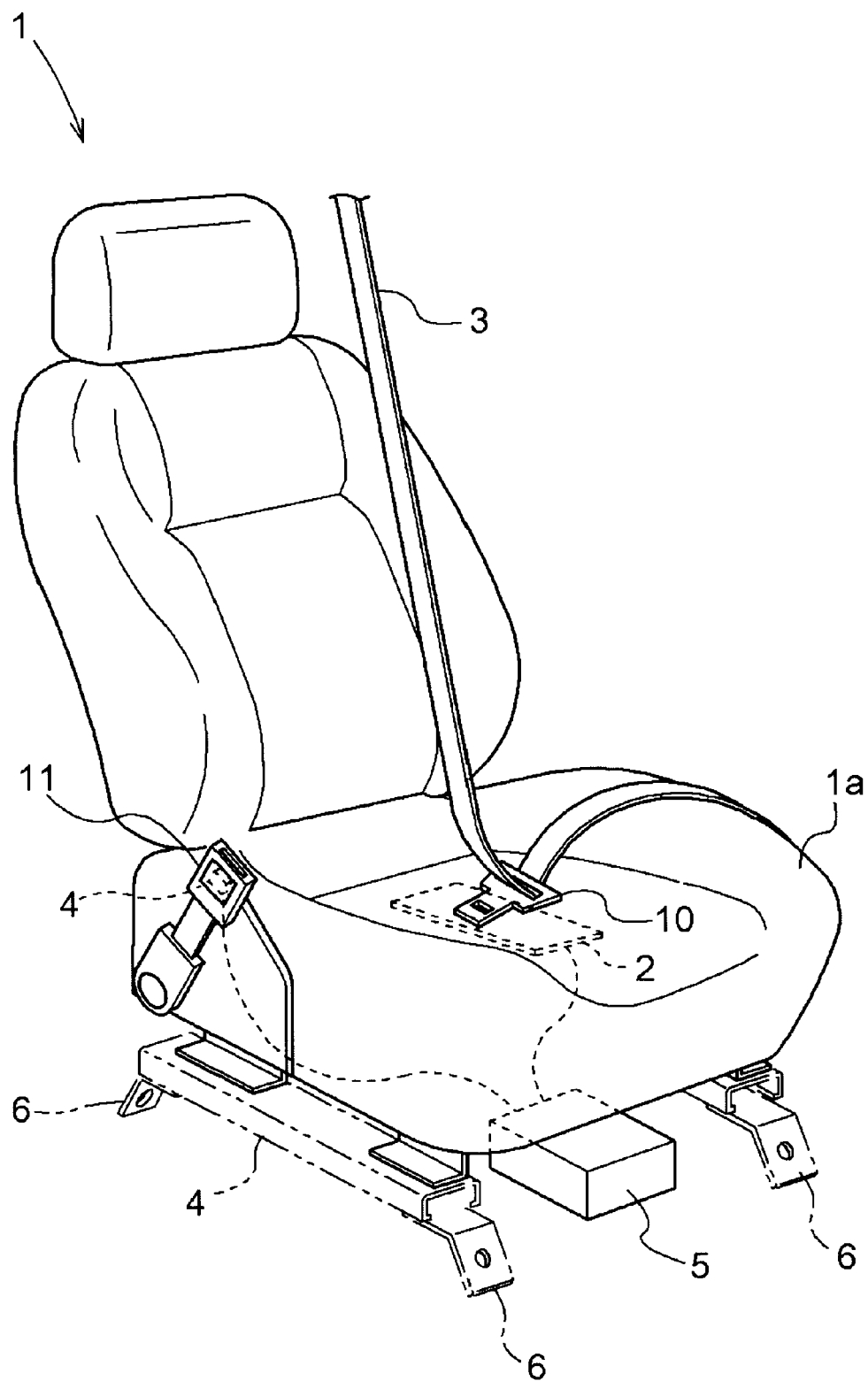
FIG. 1 is a perspective view of a seat provided with an occupant detecting apparatus according to an embodiment of the present invention.

A first embodiment will be explained as follows. An occupant detecting apparatus is provided at a passenger seat in a vehicle. As shown in FIG. 1, the occupant detecting apparatus includes an occupant sensor (i.e., serving as a detecting means) 2 which detects whether an occupant is seated on a seat 1, a buckle switch 4 which detects whether the occupant wears a seatbelt 3 (i.e., whether the seatbelt 3 is fastened) at the seat 1, and a controller 5.

The seat 1 is supported on a vehicle floor by a pair of supporting frames 6, each frame being connected to the right bracket and to the left bracket of the seat 1 respectively. A slide mechanism which slides the seat 1 in a longitudinal direction of a vehicle is provided on a top surface of each of the supporting frames 6, 6.

The occupant sensor 2 is built in the vicinity of a seating surface of a seat cushion 1a of the seat 1. The occupant sensor 2 is arranged so as to receive a load applied to the seating surface of the seat cushion 1a from above when an occupant is seated on the seating surface of the seat cushion 1a.

The occupant sensor 2 is formed in a sheet shape, as shown in FIG. 2, in which an upper film 7, a spacer 8, and a lower film 9 are laminated in the mentioned order. An upper contact point is formed on a bottom surface of the upper film 7, and a bottom contact point is formed on a top surface of the lower film 9 opposing to the top contact point. By arranging the upper contact point of the upper film 7 and the bottom contact point of the lower film 9 so as to be spaced from each other in the top-bottom direction by means of the spacer 8, the occupant sensor 2 is constructed so as to serve as a contact switch. Each of the top contact point and the bottom contact point is connected to an electric circuit, and the occupant sensor 2 outputs either an ON signal or an OFF signal on the basis of whether or not the top contact point and the bottom contact point are in contact with each other.

Figure 2A:
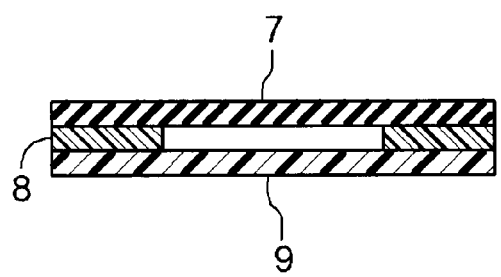
FIG. 2A is a cross-sectional view of an occupant sensor when a pressure is not applied according to the embodiment of the present invention.
Figure 2B:
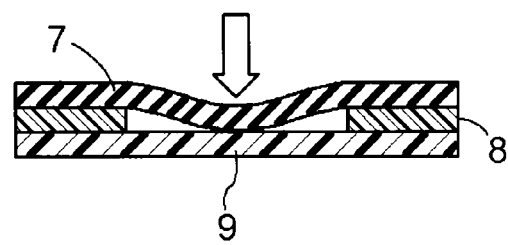
FIG. 2B is a cross-sectional view of the occupant sensor when a pressure is applied according to the embodiment of the present invention.

When the occupant is not seated on the seat cushion 1a, a load is not applied to the occupant sensor 2 from above, and, as shown in FIG. 2A, a state where the top contact point and the bottom contact point are not in contact with each other is maintained. Thus, when the top contact point and the bottom contact point are not in contact, the occupant sensor 2 outputs the OFF signal judging that the occupant is not seated on the seat 1. When the occupant is seated on the seat cushion 1a, as shown in FIG. 2B, a load is applied to the occupant sensor 2 from the above to contact the top contact point and the bottom contact point. Accordingly, when the top contact point and the bottom contact point come in contact with each other, the occupant sensor 2 outputs the ON signal detecting a condition that the occupant is seated on the seat 1, and when the top contact point and the bottom contact point are not in contact with each other, the occupant sensor 2 outputs the OFF signal detecting a condition that the occupant is not seated on the seat 1. The occupant sensor 2 serves as a detecting means to detect whether an occupant is seated on the seat 1.

A tongue plate 10 is provided at the seatbelt 3, and a buckle 11 to which the tongue plate 10 is engageable and disengageable is provided at a lateral portion of the seat cushion 1a. The buckle switch 4 is built in the buckle 11, and outputs the ON signal when the tongue plate 10 is engaged with the buckle 11 detecting a condition that the occupant wears the seatbelt 3 (i.e., a buckled state). The buckle switch 4 outputs the OFF signal when the tongue plate 10 is disengaged from the buckle 11 detecting a condition that the occupant does not wear the seatbelt 3 (i.e., an unbuckled state).

The controller 5 is configured to be inputted with the detected information of the occupant sensor 2 and the detected information of the buckle switch 4. The controller 5 includes a judging portion 12 (i.e., serving as a judging means) which judges whether the occupant occupies the seat 1 on the basis of the detected information of the occupant sensor 2. The judging portion 12 judges that the seat 1 is not occupied by the occupant when a state where the occupant sensor 2 detects that the occupant is not seated on the seat 1 (i.e., a state where the inputting signal from the occupant sensor 2 is the OFF signal) continues for a first judgment time (e.g., 5 seconds) under the condition that the judging portion 12 judged that the seat 1 is occupied. The first judgment time defines a judgment time, which conclude that the occupant is not seated on the seat 1. Further, the judging portion 12 judges that the seat is occupied when a state where the occupant sensor 2 detects that the occupant is seated on the seat 1 (i.e., a state where the inputted signal from the occupant sensor 2 is ON signal) continues for a second judgment time (e.g., 2 seconds) under the condition that the judging portion 12 judged that the seat 1 is unoccupied. By setting the second judgment time to be shorter than the first judgment time, the switching of the judgment from unoccupied to occupied is quickly performed.

The controller 5 is configured to output the judgment results to inform whether the seat 1 is occupied or unoccupied to the outside applying to another system. In this embodiment, the controller 5 may be configured to output the command information which commands to send a signal, for example, the blinking of a warning lamp to the outside when the inputted signal from the buckle switch 4 is the OFF signal under the condition that it is judged that the seat 1 is occupied. Under the condition that it is judged that the seat is occupied, the controller 5 commands, for example, the blinking of the lamp in order to inform, or warn the occupant to fasten his/her seatbelt 3.

The controller 5 includes a judgment time changing portion 13 (i.e., serving as a judgment time changing means) which changes the setting of the first judgment time to be shorter when states, from buckled to unbuckled, of the seatbelt 3 are changed, that is when the occupant unfasten the seatbelt 3. The judgment time changing portion 13 is configured to change the setting of the first judgment time to be shorter (e.g., changed to be 1 second) when the occupant sensor 2 outputs the signal that the occupant is not seated during a predetermined time (e.g., 30 seconds) (i.e., serving as a predetermined time for switching) after the states are changed from the state where the occupant wears the seatbelt 3 to the state where the occupant does not wear the seatbelt 3, that is after the states of the seatbelt 3 are changed from buckled to unbuckled. In other words, the judgment time changing portion 13 changes the setting of the first judgment time to be shorter (e.g., 1 second) when the inputted signal from the occupant sensor 2 is switched from the ON signal to the OFF signal during the predetermined time for switching (e.g., 30 seconds) after the change of the states in which the inputted signal from the buckle switch 4 was switched from the ON signal to the OFF signal.

Judgments by the judging portion 12 and switching for the setting of the first judgment time by the judgment time changing portion 13 will be explained with reference to timing charts shown in FIGS. 4A-4C.

Figure 4A:
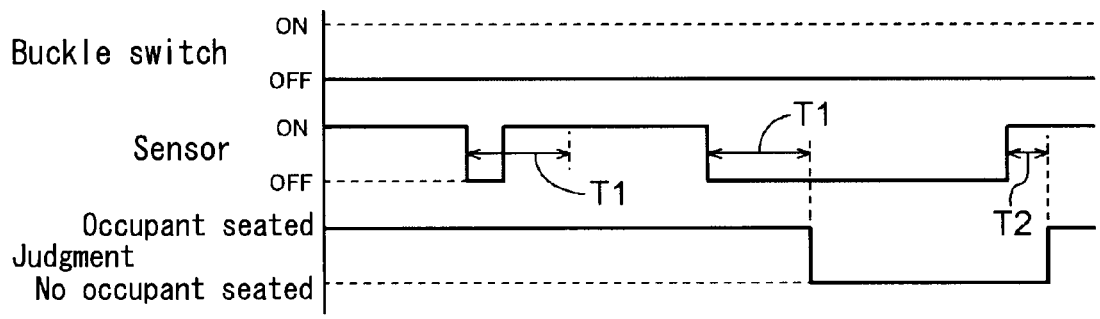
FIG. 4A is a first example of timing chart showing judgment operation by the occupant detecting apparatus according to the embodiment of the present invention.

As shown in FIG. 4A, when the inputted signal from the occupant sensor 2 is switched from the ON signal to the OFF signal under the condition that the judging portion 12 judges that the seat 1 is occupied, the judging portion 12 watches whether the OFF signal from the occupant sensor 2 continues to be outputted for the first judgment time T1 (e.g., 5 seconds). When the first OFF signal from the occupant sensor 2 in FIG. 4A is not continued for the first judgment time T1 (e.g., 5 seconds), the judging portion 12 maintains the judgment that the seat 1 is occupied by the occupant. When the second OFF signal from the occupant sensor 2 shown in FIG. 4A continues for the first judgment time T1 (e.g., 5 seconds), moreover, the judging portion 12 judges the change of the seat 1 from occupied to unoccupied by the occupant. The judging portion 12 watches whether the ON signal from the occupant sensor 2 continues to be outputted for the second judgment time T2 (e.g., 2 seconds) when the inputted signal from the occupant sensor 2 switches from the OFF signal to the ON signal under the condition that the judging portion 12 judges that the occupant does not occupy the seat 1. The judging portion 12 judges the change of the seat 1 from unoccupied to occupied by the occupant when the ON signal from the occupant sensor 2 continues for the second judgment time T2 (e.g., 2 seconds). In FIG. 4A, because the ON signal from the occupant sensor 2 continues for the second judgment time T2 (e.g., 2 seconds), the judgment result of the seat 1 is switched from unoccupied to occupied by the occupant.

Figure 4B:
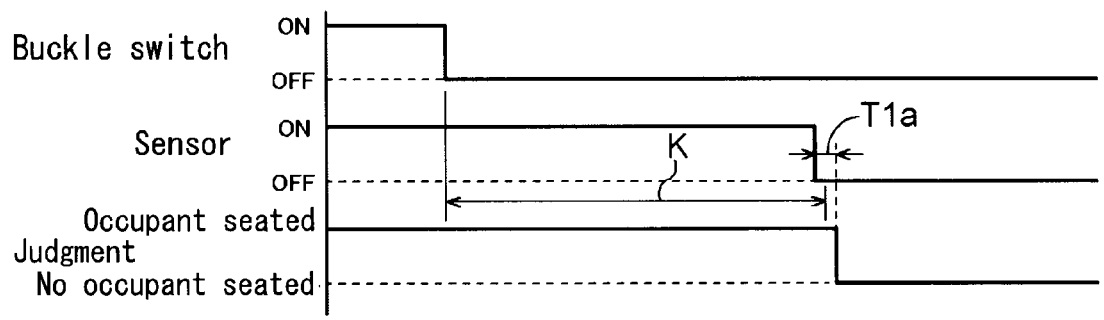
FIG. 4B is a second example of timing chart showing judgment operation by the occupant detecting apparatus according to the embodiment of the present invention.
Figure 4C:
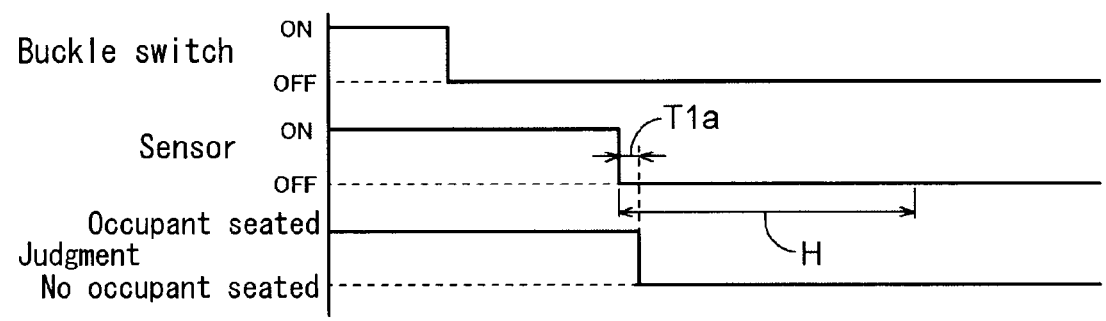
FIG. 4C is a third example of timing chart showing judgment operation by the occupant detecting apparatus according to the embodiment of the present invention.

As shown in FIG. 4B, under the condition that it is judged that the seat 1 is occupied by the occupant, the judgment time changing portion 13 changes the states in the judgment by the switching of the inputted signal from the buckle switch 4 from the ON signal to the OFF signal. The judgment time changing portion 13 changes the setting of the first judgment time T1 (e.g., 5 seconds) to a shortened first judgment time T1a (e.g., 1 second) which is shorter than the first judgment time T1 when the inputted signal from the occupant sensor 2 is switched from the ON signal to the OFF signal during the predetermined time K for switching (e.g., 30 seconds) from the change of the states of the buckle switch 4. In those circumstances, when the setting of the time is changed to the shortened first judgment time T1a (e.g., 1 second), the judgment result of the seat 1 is switched from occupied by the occupant to unoccupied by the occupant.

The judgment time changing portion 13 changes the setting of the shortened first judgment time T1*a* (e.g., 1 second) to return to the first judgment time T1 (e.g., 5 seconds) when the inputted signal from the occupant sensor 2 is switched from the ON signal to the OFF signal after an elapse of the predetermined time K for switching (e.g., 30 seconds) from the changed states of the inputted signal from the buckle switch 4 from the ON signal to the OFF signal.

A second embodiment will be explained as follows. According to the second embodiment, the judgment time changing portion 13 is different from that of the first embodiment. According to the second embodiment, when it is detected that the occupant is not seated on the seat 1 at least once based on the output signal of the occupant sensor 2 after the states are changed from that the occupant wears the seatbelt 3 to that the occupant unfastens the seatbelt 3, the first judgment time is set to be shorter for a predetermined time based on the output signal of the occupant sensor 2.

The second embodiment will be explained on the basis of a timing chart shown in FIG. 4C. When changes of the inputted signal from the sensor 2 from the ON signal to the OFF signal are once detected after the changed states of the seatbelt 3 by the switch of the inputted signal from the buckle switch 4 from the ON signal to the OFF signal under the condition that the seat 1 is occupied by the occupant, the judgment time changing portion 13 changes a setting of the first judgment time T1 (e.g., 5 seconds) to the shortened first judgment time T1*a* (e.g., 1 second) for a predetermined time H from the detection of the switching of the inputted signal. FIG. 4C shows an example where the switching of the signal of the sensor 2 from the ON signal to the OFF signal is once detected after the changed states of the seatbelt 3. In case where switching of the signal of the occupant sensor 2 from the ON signal to the OFF signal is detected plural times after the first detection within the predetermined time H, the first judgment time T1 (e.g., 5 seconds) is changed to be the shortened first judgment time T1*a* (e.g., 1 second) at each switching time of the output signal of the occupant sensor 2. When the OFF signal from the occupant sensor 2 continues to be equal to or longer than the shortened first judgment time T1*a* when the first judgment time T1 is changed to the shortened first judgment time T1*a*, the judgment result of the seat 1 is switched from occupied by the occupant to unoccupied by the occupant.

Further, the judgment time changing portion 13 changes the setting of the shortened first judgment time T1*a* (e.g., 1 second) to return to the first judgment time T1 (e.g., 5 seconds), when the changes of the inputted signal of the occupant sensor 2 from the ON signal to the OFF signal is first detected under the condition that the seat 1 is occupied by the occupant, after elapsing the predetermined time H from the first detection. In the second embodiment, the judgment time changing portion 13 may also be set not to change the first judgment time T1 (e.g., 5 seconds) to the shortened first judgment time T1*a* (e.g., 1 second) in a case where the changes of the inputted signal from the sensor 2 from the ON signal to the OFF signal is not detected during an elapse of a predetermined time (e.g., 1 minute) after the changed states of the seatbelt 3, judging that the occupant remains in the vehicle.

A third embodiment of the present invention will be explained as follows. According to the third embodiment, constructions of the judgment time changing portion 13 is different from that of the first and second embodiments. According to the third embodiment, the judgment time changing portion 13 is configured to set the first judgment time to change to be shorter by use of another changed state information of a vehicle door that changes from a closed state to an open state instead of the changed state information of the seatbelt 3 that changes from the buckled state to the unbuckled state.

Figure 3:
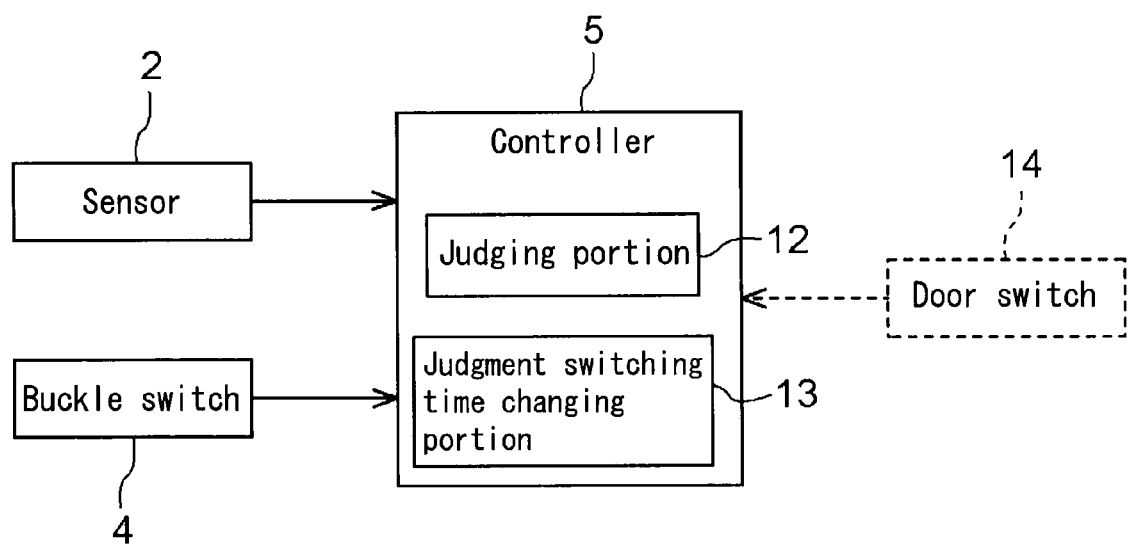
FIG. 3 is a block view for a control according to the embodiment of the present invention.

As indicated with a dotted line in FIG. 3, the occupant detecting apparatus includes a door switch 14 instead of a buckle switch 4 in the first and second embodiments which outputs an open signal (i.e., a signal which indicates that the door is open) when the vehicle door is open and outputs a closed signal (i.e., a signal which indicates that the door is closed) when the vehicle door is closed. The controller 5 is configured to be inputted with the output signal of the door switch 14. The judgment time changing portion 13 changes the setting of the first judgment time to the first shorten time when the inputted signal from the door switch 14 switches from the closed signal to the open signal, judging that the states in the occupant are changed, under the condition that the seat 1 is occupied.

A fourth embodiment will be explained as follows. In the fourth embodiment, constructions of the judgment time changing portion 13 are different from that of the first to third embodiments. According to the fourth embodiment, the judgment time changing portion 13 changes the setting of the first judgment time to be shorter when the states of the seatbelt 3 are changed from the buckled state to unbuckled state and when the states of the vehicle door is changed from the closed state to the open state. In other words, the judgment time changing portion 13 is configured to change the setting of the first judgment time to the shortened first judgment time when the inputted signal from the buckle switch 4 switches from the ON signal to the OFF signal and when the inputted signal from the door switch 14 switches from the closed signal to the open signal, judging that the states in the occupant are changed, under the condition that the seat 1 is occupied by the occupant.

The embodiments explained above may be varied as explained below. The predetermined time for switching of the first embodiment may be defined as a constant time (e.g., 30 seconds) or may be variable. In a case where the predetermined time for switching is variable, for example, when the states of the vehicle door are changed from the closed state to the open state within the predetermined time for switching (e.g., 30 seconds) after the change of the states, the predetermined time for switching is extended by, for example, 30 seconds from the timing of the change of the states of the door. The predetermined time H of the second embodiment may be defined as a constant time or may be variable.

Instead of the occupant sensor 2 serving as the detecting means for detecting whether the occupant is seated on the seat 1 of the first to fourth embodiments, other various sensors, for example, a load sensor which detects a load applied to the seat 1 may be used. In a case where the load sensor is applied, for example, the judging portion 12 judges that the seat 1 is unoccupied by the occupant when a state where a load value of the load sensor is assumed to be less than a predetermined value continues for the first judgment time (e.g., 5 seconds) under the condition that the judging portion 12 judges that the seat 1 has been occupied.

The embodiment of the occupant detecting apparatus includes the judgment time changing portion 13 changing a setting of the judgment time T1 to be shorter when at least one of changes from a buckled state to an unbuckled state of a seatbelt 3 at the seat and changes from a closed state to an open state of a vehicle door.

Namely, when a state where the occupant is not seated on the seat 1 is detected by the sensor (i.e., detecting means) 2 for the first judgment time T1 under the condition that the judging portion (i.e., judging means) 12 judges that the seat 1 is occupied, the judging portion 12 judges that the seat 1 is unoccupied. Accordingly, unless the state where the occupant is not seated on the seat 1 is detected by the sensor 2 for the first judgment time T1, the judgment result is not switched to the seat 1 being unoccupied, and thus restraining the frequent switching of the judgment results. And, in a case where the occupant gets out of the vehicle, at least one of the changes from the buckled state to the unbuckled state of the seatbelt 3 and the changes from the closed state to the open state of the vehicle door will be occurred. In those circumstances, the judgment time changing portion (i.e., the judgment time changing means) 13 changes the setting of the judgment time to be shorter when at least one of the changes from the buckled state to the unbuckled state of the seatbelt 3 and the changes from the closed state to the open state of the vehicle door is occurred under the condition that the judging portion 12 has been judging that the seat 1 is occupied. Accordingly, when the occupant gets out of the vehicle and the state that the occupant is not seated on the seat 1 by the sensor (detecting means) 2 continues for the shortened first judgment time which is changed to be shortened by the judgment time changing portion 13, the judging portion 12 judges that the seat 1 is unoccupied to shorten the time elapsing until switching the judgment result. Accordingly, the occupant detection apparatus which promptly switches the judgment result that the seat 1 is unoccupied when the occupant gets out of the vehicle while restraining frequent switching of the judgment result is provided.

According to the subject matter of the occupant detecting apparatus, the judgment time changing portion 13 changes the setting of the judgment time T1 to be shorter when the detecting portion 12 detects that the occupant is not seated on the seat 1 during a predetermined time after at least one of the changes from the buckled state to the unbuckled state of the seatbelt 3 and the changes from the closed state to the open state of the vehicle door.

Namely, even when the states of at least one of the seatbelt 3 and the vehicle door are changed, the occupant does not always get out of the vehicle. In a case where the occupant remains in the vehicle, when the judgment time is shorten, the judgment result may possibly be switched frequently. In a case where the occupant gets out of the vehicle, after the states in the occupant are changed, the sensor (detecting means) 2 detects that the occupant is not seated on the seat 1 for the predetermined time T1 from the changed states of the occupant. In those circumstances, where the occupant is not seated on the seat 1 is detected by the sensor (detecting means) 2 within the predetermined time from the change of the states, the judgment time changing portion (means) 13 changes the setting of the judgment time to be shorter based on a judgment that the occupant gets out of the vehicle. Consequently, according to the construction of the occupant detecting apparatus, while appropriately changing the judgment time to be short when the occupant gets out of the vehicle, changing the setting of the judgment time to be short when the occupant does not get out of the vehicle is restrained to the minimum.

According to the subject matter of the occupant detecting apparatus, the judgment time changing portion 13 is configured to change the setting of the judgment time to be shorter for a predetermined time, when the detecting means detects that the occupant is not seated on the seat 1 at least one time from changes of states after at least one of the changes from the buckled state to the unbuckled state of the seatbelt 3 and the changes from the closed state to the open state of the vehicle door, based on the detected results.

According to the subject matter of the occupant detecting apparatus, in a case where the occupant gets out of the vehicle, when the sensor (detecting means) 2 detects that the occupant is not seated on the seat 1 at least one time since the change of the states, the occupant gets out of the vehicle within a predetermined time after the detection. In those circumstances, in a case where the sensor (detecting means) 2 detects that the occupant is not seated on the seat 1 at least one time since the change of the states, the judgment time changing portion (means) 13 changes the judgment time to be shorter during the predetermined time from the detection judging that the occupant is getting out of the vehicle. Consequently, while appropriately changing the setting of the judgment time to be shorter when the occupant gets out of the vehicle, changing the setting of the judgment time to be shorter when the occupant does not get out of the vehicle is restrained at a maximum.

According to the subject matter of the occupant detecting apparatus, the detecting portion 2 is a sensor which outputs either one of an ON signal or an OFF signal by detecting whether the occupant is seated on the seat 1 based on a load applied to the seat 1.

According to the subject matter of the occupant detecting apparatus, the sensor 2 detects whether the occupant is seated in the seat 1 on the basis of the load applied to the seat 1 to output at least one of ON signal and OFF signal, which has a simple construction and whose manufacturing cost is low. Accordingly, by applying the sensor 2, while reducing the manufacturing cost and simplifying the construction, the judgment result is switched promptly when the occupant gets out of the vehicle while restraining the frequent switches of the judgment result.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant detecting apparatus, comprising:
   a detecting means detecting whether an occupant is seated on a seat; and
   a judging means judging whether the occupant occupies the seat on the basis of information detected by the detecting means,
   wherein the judging means judges that the seat is unoccupied by the occupant when a state where a detection that the occupant is not seated on the seat by the detecting means continues for a judgment time after the detecting means detects that the seat is occupied by the occupant, and
   wherein the occupant detecting apparatus further includes a judgment time changing means changing a setting of the judgment time to be shorter when at least one of changes from a buckled state to an unbuckled state of a seatbelt at the seat and changes from a closed state to an open state of a front passenger door of a vehicle.

2. The occupant detecting apparatus according to claim 1, wherein the judgment time changing means changes the setting of the judgment time to be shorter when the detecting means detects that the occupant is not seated on the seat during a predetermined time after at least one of the changes from the buckled state to the unbuckled state of the seatbelt and the changes from the closed state to the open state of the vehicle door.

3. The occupant detecting apparatus according to claim 1, wherein the judgment time changing means is configured to change the setting of the judgment time to be shorter for a predetermined time, when the detecting means detects that the occupant is not seated on the seat at least one time from changes of states after at least one of the changes from the buckled state to the unbuckled state of the seatbelt and the changes from the closed state to the open state of the vehicle door, from the detection of the occupant.

4. The occupant detecting apparatus according to claim 1, wherein the detecting means is a sensor which outputs either one of an ON signal or an OFF signal by detecting whether the occupant is seated on the seat based on a load applied to the seat.

* * * * *